United States Patent
Kozdon et al.

(10) Patent No.: US 7,813,488 B2
(45) Date of Patent: Oct. 12, 2010

(54) SYSTEM AND METHOD FOR PROVIDING INFORMATION REGARDING AN IDENTITY'S MEDIA AVAILABILITY

(75) Inventors: Peter Kozdon, Santa Clara, CA (US); Timothy Adam Miller, Munich (DE); Mark Bernard Hettish, Cary, NC (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 0 days.

(21) Appl. No.: 10/673,986

(22) Filed: Sep. 29, 2003

(65) Prior Publication Data

US 2005/0069099 A1   Mar. 31, 2005

(51) Int. Cl.
*H04M 3/42* (2006.01)
*H04M 1/64* (2006.01)
*H04M 11/00* (2006.01)

(52) U.S. Cl. .............. 379/201.04; 379/88.11; 379/93.17

(58) Field of Classification Search .............. 379/88.11, 379/93.17, 201.04
See application file for complete search history.

(56) References Cited

U.S. PATENT DOCUMENTS

| | | | |
|---|---|---|---|
| 5,544,321 A | 8/1996 | Theimer et al. | |
| 5,812,865 A | 9/1998 | Theimer et al. | |
| 6,301,609 B1 | 10/2001 | Aravamudan et al. | |
| 6,310,632 B1 | 10/2001 | Monroe et al. | |
| 6,360,172 B1* | 3/2002 | Burfeind et al. | 702/2 |
| 6,366,962 B1 | 4/2002 | Teibel | |
| 6,404,443 B1* | 6/2002 | Westerman | 715/776 |
| 6,459,913 B2* | 10/2002 | Cloutier | 455/567 |
| 6,463,471 B1 | 10/2002 | Dreke et al. | |
| 6,539,421 B1* | 3/2003 | Appelman et al. | 709/206 |
| 6,549,937 B1 | 4/2003 | Auerbach et al. | |
| 6,563,430 B1 | 5/2003 | Kemink et al. | |
| 6,594,699 B1* | 7/2003 | Sahai et al. | 709/228 |
| 6,650,735 B2* | 11/2003 | Burton et al. | 379/88.01 |
| 6,658,095 B1* | 12/2003 | Yoakum et al. | 379/93.01 |
| 6,981,223 B2* | 12/2005 | Becker et al. | 715/753 |
| 7,024,199 B1* | 4/2006 | Massie et al. | 455/445 |
| 7,069,016 B2* | 6/2006 | Crisler et al. | 455/453 |
| 7,127,685 B2* | 10/2006 | Canfield et al. | 715/842 |
| 7,231,229 B1* | 6/2007 | Hawkins et al. | 455/564 |
| 7,245,711 B2* | 7/2007 | Margolis | 379/209.01 |
| 7,296,295 B2* | 11/2007 | Kellerman et al. | 726/26 |
| 7,590,231 B2* | 9/2009 | Tighe et al. | 379/202.01 |
| 7,710,945 B2* | 5/2010 | Jonsson | 370/352 |
| 7,720,606 B2* | 5/2010 | Burfeind et al. | 702/3 |
| 2001/0042126 A1 | 11/2001 | Wong et al. | |
| 2001/0053214 A1 | 12/2001 | Kleinoder et al. | |
| 2002/0116336 A1 | 8/2002 | Diacakis et al. | |

(Continued)

OTHER PUBLICATIONS

"AOL Instant Messenger—Help/FAQs: Using AIM", © 2002 America Online, Inc., 5pgs., download from http://www.aim.aol.com/help_faq/using/buddylist.adp?aolperm= on Aug. 12, 2003.

(Continued)

*Primary Examiner*—Joseph T Phan
(74) *Attorney, Agent, or Firm*—Buckley, Maschoff & Talwalkar LLC

(57) ABSTRACT

Embodiments provide a system, methods, apparatus, means, and computer program code for providing information regarding an identity's media channel availability.

10 Claims, 5 Drawing Sheets

BRIAN

On Vacation

Phone Calls

Instant Messages

U.S. PATENT DOCUMENTS

| | | | |
|---|---|---|---|
| 2002/0116461 | A1 | 8/2002 | Diacakis et al. |
| 2002/0120687 | A1 | 8/2002 | Diacakis et al. |
| 2002/0187781 | A1 | 12/2002 | Furlong |
| 2003/0014488 | A1 | 1/2003 | Dalal et al. |
| 2003/0028621 | A1 | 2/2003 | Furlong et al. |
| 2003/0105820 | A1* | 6/2003 | Haims et al. ............ 709/205 |
| 2003/0120805 | A1* | 6/2003 | Couts et al. ............ 709/238 |
| 2005/0044143 | A1* | 2/2005 | Zimmermann et al. ...... 709/204 |

OTHER PUBLICATIONS

Morrissey, Peter "It's Time To Take a Look at SIP", Apr. 24, 2003, download from http://www.hostingtech.com/news/2003/4/24/Print/St_Nitf_Its_Time_To_Take_a_Look_At_... on Jul. 1, 2003. © CMP Media LLC, 3pgs.

Jsřgen Bjsřkner "SIP: The Key to Unified Communications", download from http://www.tdap.co.uk/us/archieve/internet/int(sip_0109).html on Jul. 1, 2003, © International Clearing House Ltd 1997-2001. 3pgs.

McElligott, Tim "Your presence is requested", Telephony, Feb 5, 2001, download from http://telephonyonline.com/ar/telecom_presence_requested/ on Jun. 18, 2003, © 2003 Primedia Business Magazines & Media Inc. 5pgs.

Saunders, Christopher "Presence and Availability: Coming to a Mobile Phone Near You", Apr. 22, 2003, download from http://itmanagement.earthweb.com/entdev/article.php/2194831 on Jun. 18, 2003, Copyright 2003 Jupitermedia Corporation, 7pgs.

Roychowdhury, Arjun and Moyer, Stan "Instant Measaging and Presence for SIP Enabled Networked Appliances", 7pgs.

"SIP (Session Initiation Protocol) in Enterprise—Class IP Telephony Networks", White Paper, Communication without boundaries, 201 2002 Avaya Inc. 12pgs.

* cited by examiner

SYSTEM AND METHOD FOR PROVIDING INFORMATION REGARDING AN IDENTITY'S MEDIA AVAILABILITY

FIELD

The present invention relates to a method, system, means and computer code for providing information regarding an identity's media availability.

BACKGROUND

A person in a multi-media or multi-channel communications system may have or use multiple devices, such as a telephone, personal digital assistant (PDA), computer, etc. Thus, the person may be represented by or associated with the different types of devices. A second person may want to contact the first person via email, instant message communication, telephone call, etc. The ability of the second person to contact or communicate with the first person may be limited by the availability of the device(s) chosen by the second person and/or the availability of the first person. For example, if the first person currently is using his or her telephone, the second person may not be able to contact the first person via telephone. However, the second person may be able to contact the first person via an email message sent to the first person's computer. In addition, if the first person is on vacation or out of the office, the second person may not be able to reach the first person via a telephone or computer located at the first person's office, but may be able to reach the first person via cellular telephone. As another example, if the first person is "busy," the second person might not be able to reach the first person at all, even if all of the devices associated with the first person are currently available.

If the second person can determine the availability of the first person's different media channels and/or the availability of one or more devices associated with the first person, the second person may be able to make better choices regarding how to communicate with the first person. As such, there is a need for a system, method, apparatus, means, and computer program code for providing information regarding an identity's media availability.

SUMMARY

Embodiments provide a system, method, apparatus, means, and computer program code for determining and/or providing information regarding an identity's media availability. In some embodiments an identity may be or include an individual person/user or a group of people/users. Each identity may have multiple devices associated with it. For example, a person may have various devices (e.g., cellular telephone, computer, personal digital assistant) that support voice calls and/or instant messaging. If the person is on a voice call, then the person's media availability with regard to devices that support voice calls may be set to unavailable because that person can engage in only a single voice call at a time. However, the person still may be able to participate in communications involving instant messages. Other people may receive or retrieve the information regarding the person's availability via different media channels and attempt to contact the person via a media channel that is available.

As mentioned above, in some embodiments an identity may be or include an individual person or a group of people. Each identity may have an identity context associated with it. Along with an identify context is an implied state of availability. For example, an identity context for an identity could be a state of "in a meeting," "on vacation," "in the office," "out of the office," "roaming," "offline," "online," "in transit," "mobile," etc. Thus, the identity context describes the implied or actual availability of the identity. An identity may have one or more devices associated with it. Each device may have an associated device context. Context for a device may describe the work or non-work state, and/or the availability or non-availability state, that the device is in. For example, the person's office telephone may be busy, set to "do not disturb," automatic call forwarding, offline, etc.

Additional advantages and novel features shall be set forth in part in the description that follows, and in part will become apparent to those skilled in the art upon examination of the following or may be learned by the practice of the invention.

According to some embodiments, a method may include determining a device associated with an identity; determining a media capability associated with the device; determining availability information for the media capability; and providing data indicative of the availability information. Determining a device associated with an identity may include determining multiple devices associated with the identity. Similarly, determining a media capability associated with the device may include determining at least one media capability for each of the multiple devices, determining availability information for the media capability may include determining availability information for each of the at least one media capability for each of the multiple devices, and providing data indicative of the availability information may include providing data indicative of availability information for each of the at least one media capability for each of the multiple devices. Other embodiments may include means, systems, computer code, etc. for implementing some or all of the elements of the methods described herein.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE FIGURES

The accompanying drawings, which are incorporated in and form a part of the specification, illustrate embodiments of the invention.

DESCRIPTION OF SPECIFIC EMBODIMENTS

Figure 1:
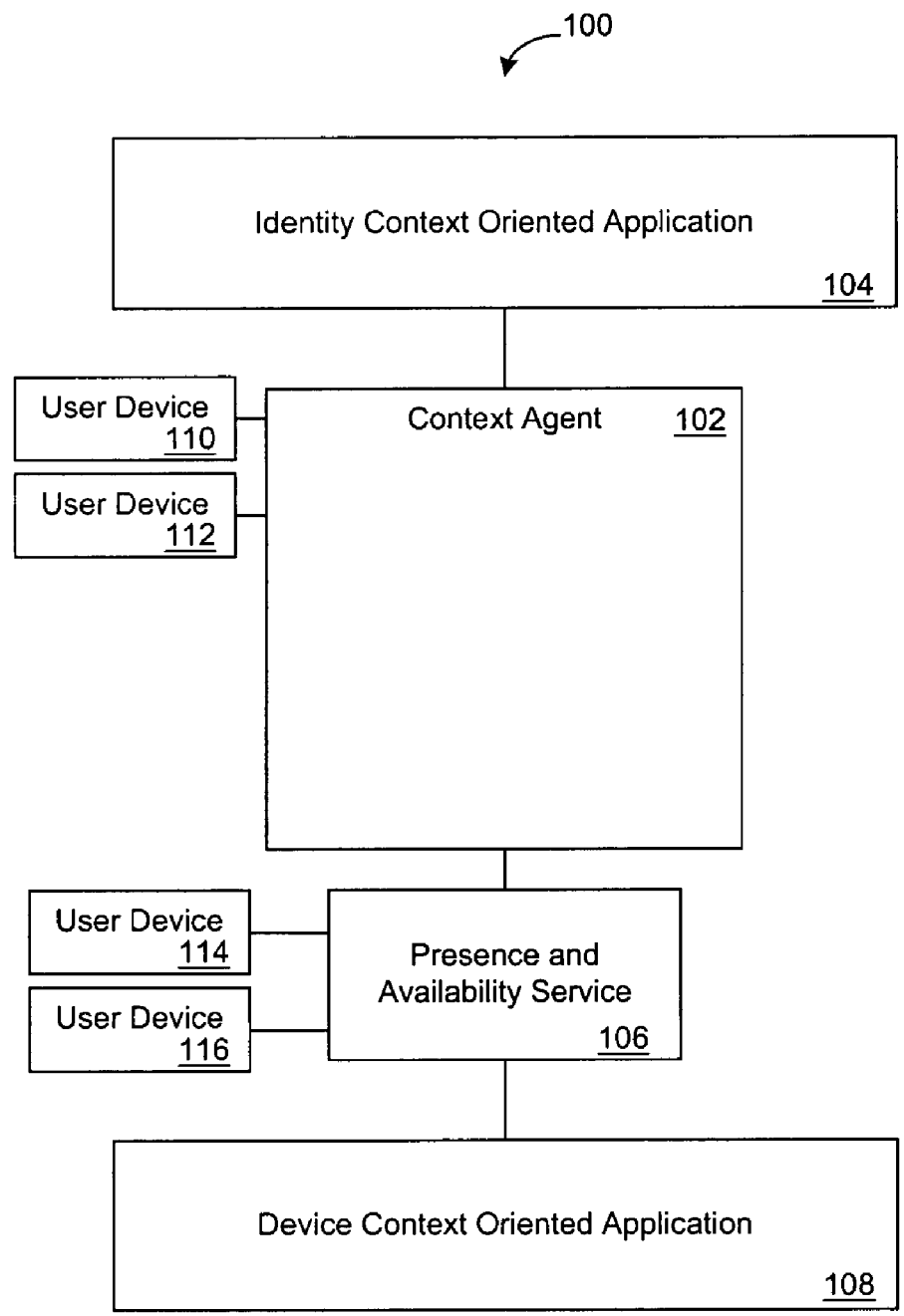
FIG. 1 is a block diagram of a system according to some embodiments.

There is a market opportunity for systems, means, computer code, and methods that allow and enable information regarding availability of one or more media channels associated with a first identity (e.g., an individual person/user) to be determined and/or provided to one or more other identities who may wish to contact the first identity. In some embodiments, information regarding the media availability for the first identity may be displayed via an interface on another's user device (e.g., computer, PDA, cellular telephone) so that a true picture of media availability for the first identity is obtained. In some embodiments, media aggregation availability may indicate the availability of one or more media channels to the identity, but might not indicate the availability of the identity or the identity context of the identity.

Availability of an identity may be limited by availability of the devices associated with the entity or conditions imposed on or by the identity (e.g., the identity may be unable or unwilling to receive a telephone call while the identity is participating in a meeting). However, since an identity often uses more than one device, availability of the identity at one of the devices may not reflect the true availability of a specific media channel with respect to the identity. For example, suppose the identity has a SIP (Session Initiation Protocol) client application on a workstation providing a "soft" telephone and an Instant Messaging Application. If the soft client telephony application is busy, the identity still may be contactable in other ways, e.g., instant messaging. If the soft client is busy on a voice call, the identity still may be able to accept instant messaging sessions, or vice versa. In some embodiments an identity may be or include an individual person/user or a group of people/user. Each identity may have an associated identity context. An identity context for the identity could be a state of "in meeting," "on vacation," "in the office," "out of the office," "roaming," "offline," "online," "unknown," "on business trip," "in transit," "mobile," etc. Thus, the identify context describes the availability of the identity.

An identity context then may allow an identity to have an overall state that describes work or non-work or availability or unavailability state that the identity is in. The identity context could apply to one or more media types associated with the identity. For example, an identity context state of "offline" for an identity may indicate that the identity is generically offline for any number of reasons. Thus, a potential communicator with this identity should not expect to get any live contact. As another example, an identity context state of "online" for an identity may indicate that the identity is generically online. Thus, a potential communicator with this identity could expect some chance of communicating with the identity by voice, instant messaging, etc. An identity context state of "in meeting" for an identity may indicate that the identity is not at his or her desk, but elsewhere attending a meeting. Thus, a potential communicator with this identity might expect to be able to get voice or instant messaging contact only in urgent situations. An identity context state of "in the office" for an identity may indicate that the identity is in his or her office. Thus, potential communicator may be able to reach the identity via voice or instant message communication with devices in the identity's office or via an email message sent to a device in the identity's office. An identity context state of "roaming" for an identity may indicate that the identity is in the office, but not necessarily at his or her desk. However, the identity may be available via a cellular telephone or other mobile device associated with the identity. An identity context state of "do not disturb" or "DND" for an identity may indicate that the identity is not accepting telephone calls, instant message communications, and/or other forms of communication. An identity context state of "in transit" for an identity may indicate that the identity is currently out of the office, away from home, and/or mobile on the way to a destination. This state also may imply that the identity has a specific mobile device (e.g., cellular telephone, PDA) and can be contacted via one or both of those devices. An identity context state of "mobile" for an identity may indicate that the identity is working or located at a more permanent mobile environment. This context may imply that identity may be reachable via a portable or mobile device or a communication device associated with the permanent mobile environment.

In some embodiments, different applications may be used to set, monitor or change an identity context for an identity. For example, a calendar program, telephone user interface, graphical user interface, plug-in, etc. may allow or enable an identity to set or change an identity context for the identity manually or automatically.

An identity may have one or more associated devices. For example, a person may have an associated office telephone, a home telephone, an office telephone, a cellular telephone, computer, personal digital assistant (PDA), etc. Each device may have an associated device context. For example, the person's office telephone may be busy, set to "do not disturb," automatic call forwarding, offline, etc. Context for a device may describe the work or non-work state, and/or the availability or non-availability state, that the device is in. In some embodiments, potential device contexts may include "available," "non-available," "busy," "away," "unknown," "partially available" (e.g., a device may be "busy" on a voice channel but available on an instant messaging channel), "be right back," "present," not present," etc. In some embodiments, different applications may be used to set, monitor or change a device context for a device. For example, software operating on a computer may allow an identity to indicate manually or automatically that the computer is unavailable for email, instant messaging, file transfer or other communications at the current time, at a specific later time, during a time range, etc. As another example, a wireless and instant messaging capable PDA may be considered as having a device context as "available" by a presence and availability service when the PDA is online and a device context of "unavailable" by the presence and availability service when the PDA is offline.

Now referring to FIG. 1, an exemplary system 100 is illustrated according to some embodiments. The system 100 includes a context agent 102 that may be connected to or in communication with an identity context oriented application 104 and a presence and availability service 106. The system 100 also may include a device context oriented application 108 connected to or in communication with the presence and availability service 106. In some embodiments, not all of the components illustrated in FIG. 1 will be needed or used.

In some embodiments, one or more user devices, such as the user devices 110, 112, may be connected to or in communication with the context agent 102. Similarly, user devices, such as user devices 114, 116, may be connected to or in communication with the presence and availability service 106. In some embodiments, a user device may be or include such things as telephones, cellular telephones, PDAs, computers, etc. For example, the user devices 114, 116, may be personal computers implementing the Windows XP™ operating system and the Windows Messenger™ instant messenger system. In addition, the user devices 114, 116 may include telephony and other multimedia messaging capability using, for example, peripheral cameras, Webcams, microphones and speakers (not shown) or peripheral telephony handsets, such as the Optipoint™ handset available from Siemens Information and Communication Networks.

In some embodiments, the system 100 may include other hardware and/or software components (e.g., gateways, proxy servers, registration servers, presence servers, redirect servers, databases, applications, telephone systems, communication networks), such as, for example, hardware and software used to support a SIP or other protocol based infrastructure for the system 100 and allow registration of SIP devices in the system 100.

In some embodiments, the context agent 102 may monitor the identity context of one or more identities and/or the device context of one or more devices. In some embodiments, the context agent 102 may provide or include an application interface that supports identity context, device context, device presence, and/or other functions. Applications may monitor, access and/or query the context agent 102 for identity context and/or device context information. In some embodiments, applications also may modify the identity context and/or device context information via the context agent 102.

In some embodiments, the context agent 102 may maintain or have access to information regarding the devices associated with one or more identities, the media capabilities for one or more devices associated with one or more identities, etc. For example, the context agent 102 may determine or be able to find out that a SIP telephone associated with an identity has both voice and instant messaging capabilities. In some cases, other applications or devices may provide media capability information to the context agent 102 and/or the context agent 102 may be able to retrieve the media capability information from a device (e.g., a registration server) or application.

In some embodiments, the context agent 102 may provide information to the identity context oriented application 104 upon request, periodically, or in accordance with some other plan or procedure. In addition, in some embodiments, the context agent 102 may provide information regarding device context. For example, an application may query the context agent 102 to monitor or determine the device context of one or more devices. In some embodiments, an application may set or request a change for either an identity context and/or a device context. For example, an application that sets an identity context for an identity to "in meeting" may set the device context for the identity's desk telephone to "offline" for both voicemail and instant messaging.

In some embodiments, the context agent 102 may be able to receive, retrieve, or otherwise obtain information regarding an identity and/or a device associated with the identity, such as calendar information, schedule information, location information, configuration information, context information, etc.

The context agent 102 may be implemented in hardware and/or software operating on one or more servers, computer systems, host or mainframe computers, workstations, etc. In some embodiments the context agent 102 may be operating on some or all of the same device(s) as other components in the system 100. In some embodiments, the context agent 102 may include other modules, components, service, etc. to perform some or all of its functionality.

In some embodiments, the identity context oriented application 104 may be or include an application that uses, collects, refers to, provides, etc. information regarding the identity context of one or more identities. For example, an identity context oriented application may be or include software that allows identities to provide information regarding their availability, location, etc. In some embodiments, a user device, server, host or mainframe computer, workstation, etc. may include an identity context oriented application or have one operating or residing on it. The identity context oriented application 104 may be implemented in hardware and/or software operating on one or more servers, computer systems, host or mainframe computers, workstations, etc. In some embodiments the identity context oriented application 104 may be operating on some or all of the same device(s) as other components in the system 100.

The presence and availability service 106 may be or include an application that monitors the presence and availability of devices. That is, the presence and availability service 106 monitors the device context of one or devices. In some embodiments, one or more of the devices may be associated with the identities whose context is used or monitored by the identity context oriented application 104. The presence and availability service 106 may be implemented in software operating on one or more servers, computer systems, host or mainframe computers, workstations, etc. In some embodiments the presence and availability service 106 may be operating on some or all of the same device(s) as other components in the system 100.

In some embodiments, the presence and availability service 106 may be or include an application that communicates with or is connected to one or more registered devices (e.g., devices 114, 116), and that allows devices to register with the system 100 or helps facilitate their registration, etc. For example, in a SIP environment, the devices 114, 116 may be registered with the system 100 and may show up or be described in registration databases as being assigned to particular identities. The context agent 102 may register with the presence and availability service 106 and receive device context and/or other information from the presence and availability service regarding the devices 114, 116 and/or other devices.

In some embodiments, the presence and availability service 106 may provide device context information to the device context oriented application 108 upon request, periodically, or in accordance with some other plan or procedure. In some embodiments, the presence and availability service may implement an instant messaging system. For example, the instant messaging system may be embodied as Microsoft Windows Messenger™ software or other instant messaging system.

The device context oriented application 108 may be or include an application that uses, collects, refers to, etc. information regarding the device context of one or more device (e.g., the user device 114). For example, a device context oriented application may be or include software that allows identities to provide or request information regarding the availability of devices associated with the identities, etc. In some embodiments, a user device, server, host or mainframe computer, workstation, etc. may include a device context oriented application or have one operating or residing on it. The device context oriented application 108 may be implemented in hardware and/or software operating on one or more servers, computer systems, host or mainframe computers, workstations, etc. In some embodiments the device context oriented application 108 may be operating on some or all of the same device(s) as other components in the system 100.

The terms "identity context," "device context," "context agent," "presence and availability service," "identity context oriented application," and "device context oriented application" are used herein merely for purposes of convenience and ease of explanation and no specific limitations are intended or implied by the use of these terms herein.

Figure 2:
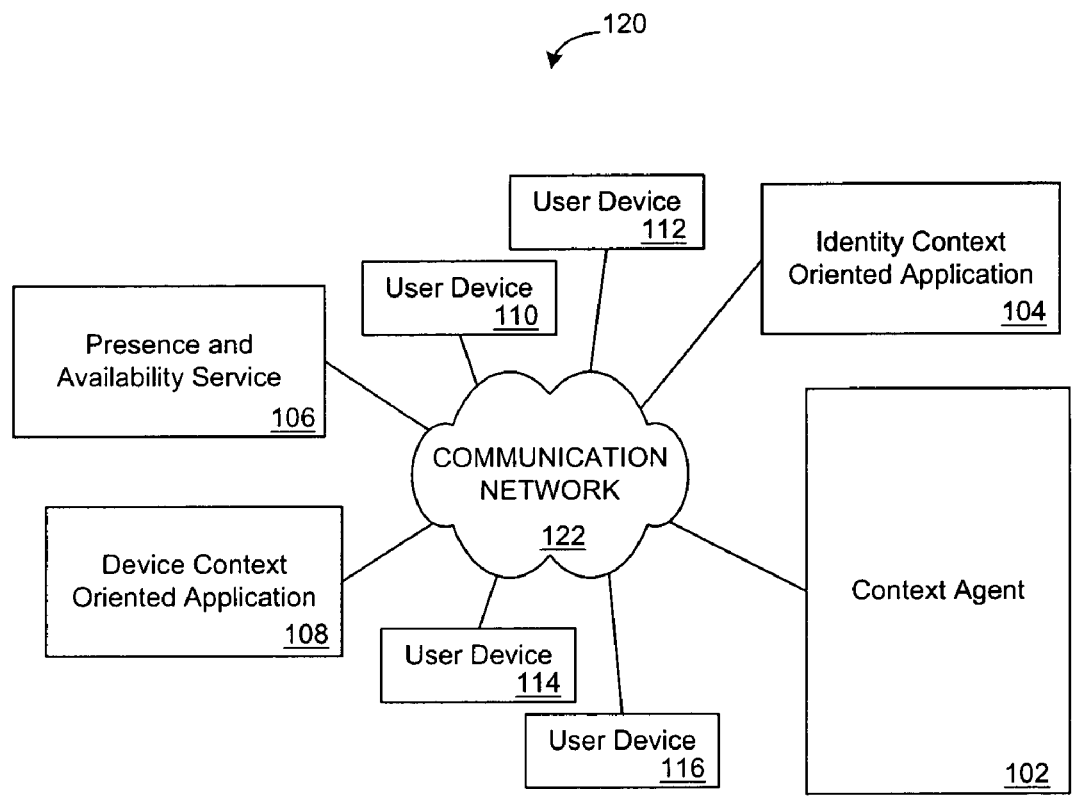
FIG. 2 is another block diagram of the system according to some embodiments.

In some embodiments, one or more of the components of the system 100 may be connected or in communication with each other via a communication network. For example, now referring to FIG. 2, a system 120 including the components of the system 100 is illustrated, wherein some or all of the components are in direct or indirect communication via a network 122. The network 122 may be or include the Internet, the World Wide Web, a local area network, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 122 may be implemented using a TCP/IP network and may implement voice or multimedia over IP using, for example, the Session Initiation Protocol (SIP).

Process Description

Figure 3:
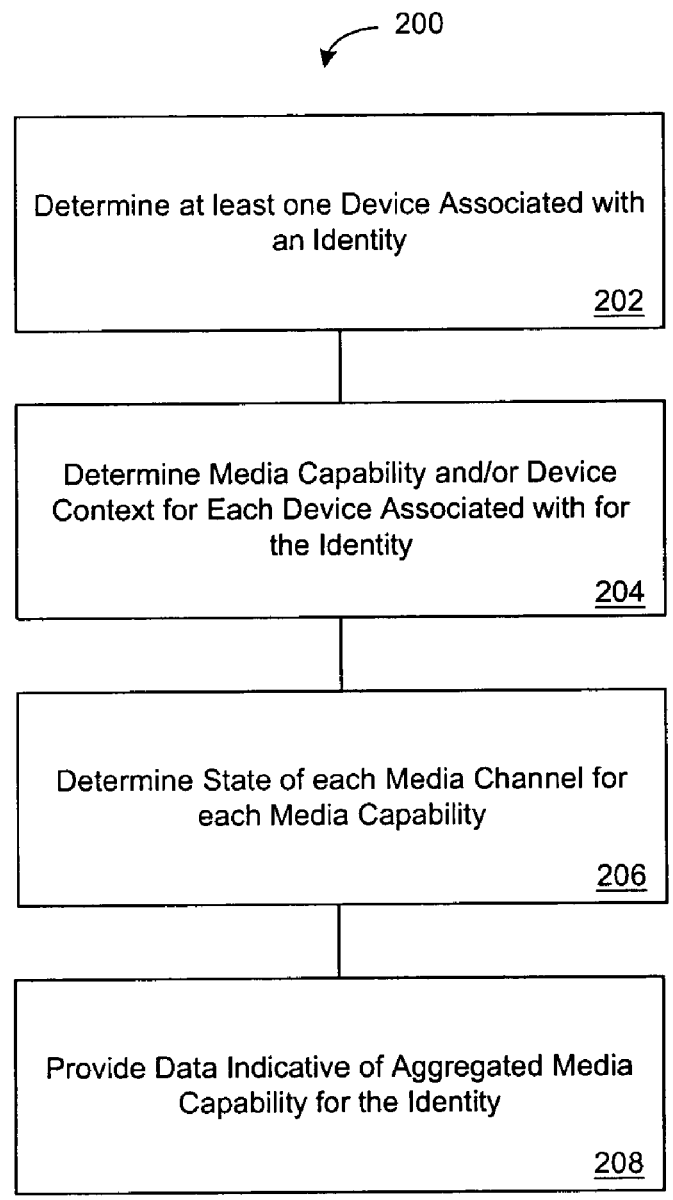
FIG. 3 is a flowchart of a method in accordance with some embodiments.

Reference is now made to FIG. 3, where a flow chart 200 is shown which represents the operation of a first embodiment. The particular arrangement of elements in the flow chart 200 is not meant to imply a fixed order to the elements; embodiments can be practiced in any order that is practicable. In some embodiments, the context agent 102 may implement the method 200.

Processing begins at 202 during which one or more devices associated with an identity are determined. As previously discussed above, the context agent 102 may monitor, have, or be able to obtain information regarding devices associated with one or more identities. In some embodiments, the method 200 may include the context agent 102 receiving a request to provide information or data regarding media availability for an identity or device.

During 204, the media capability and device context for the devices are determined for the devices identified in 202. As previously discussed above, the context agent 102 may monitor, have, or be able to obtain information regarding the media capabilities (e.g., connection speeds, connection types, protocols, cache size) and/or device contexts for one or more devices associated with one or more identities and/or may maintain information regarding such devices.

Some devices may be able to support more than one type of media capability or communication channel. For example, a PDA may be able to receive an email message and/or an instant message communication. A SIP telephone may be able to communicate via voice call and/or instant messaging.

During 206, the availability state of each media channel for each media capability is determined for the devices identified in 202. In some embodiments, a media channel for a device may be available, unavailable, or unknown. For example, the context agent 102 may have, or be able to determine or obtain, information regarding whether a SIP telephone associated identity with an identity is able or unable to accept telephone calls and/or instant messages. As another example, the context agent may use or implement one or more rules, algorithms, heuristics, procedures, etc. to determine if the SIP telephone is able to receive or participate in a voice call and/or an instant message communication. As another example, an identity may establish a rule that provides if he is on a telephone call using the SIP telephone, then his voice media channel and his instant message channel on the SIP telephone both should be considered unavailable. However, the identity may establish another rule that provides that the voice media channel should be considered available even if the instant message channel becomes unavailable.

In some cases, a device context for a device may apply to all media capabilities that the device can support or may apply only to a subset of the media capabilities that the device can support. For example, if a device context for a device is "DND" or "busy", all media channels for the device may be considered unavailable.

In some embodiments, information other than device context may be used to determine availability of a media channel. For example, in some embodiments, an identity context for an identity associated with a device may be useful in determining whether or not a device channel is available. As a more specific example, if an identity has an identity context of "offline", all of the media channels for devices associated with the identity may be considered as "unavailable". As another example, in some embodiments, media availability for an identity may be augmented by using information such as calendar and schedule information, location information, caller identity information, media channel conversion ability (e.g., ability to convert from an instant message to an email message) information, etc. Thus, in some embodiments, the method 200 may include determining or setting an identity context for the identity. For example, the identity context oriented application 104 may set an identity context for the identity or the context agent 102 may receive or otherwise obtain information from the identity context oriented application 104 or another device, application, etc. regarding the identity context for the identity.

During 208, information or other data regarding the media availability determined for the devices is sent or otherwise provided. For example, the context agent 102 may send, transmit or otherwise provide aggregated media capability information for an identity's devices directly or indirectly to devices (e.g., the user devices 110, 112) used by other identities that may wish to contact the identity. The devices may display the media availability information via interfaces. As another example, the context agent 102 may provide the data directly or indirectly to a database server, Web site server, the identity context application oriented application 104, the device context oriented application 108, or another device or application. The context agent 102 may include a service, module or component that provides the media capability information to devices, applications, etc., updates the media capability information when requested, needed, or appropriate, etc. In some embodiments, the context agent 102 may provide media capability information regarding one or more identities whenever such information changes, in accordance with one or more rules, in accordance with a designated procedure or time schedule, randomly, upon request only, etc.

In some embodiments, the data provided in 208 may indicate which or what kind of devices may be used to contact a specific identity. In other embodiments, the data may not indicate such device information, but rather may indicate the type of or specific media channels in or via which the specific identity can be contacted.

In some embodiments, media channel availability may be determined in accordance with one or more rules, heuristics, procedures, algorithms, mapping conventions, etc. that may be established by a system administrator, identity, group, etc. The method 200 may include determining, using, obtaining information regarding, and/or accessing such rules, heuristics, procedures, algorithms, conventions, etc.

In some embodiments, the context agent 102 may implement the method 200 randomly, periodically, upon request, upon or after receiving an indication of a change in device context for a device, upon or after receiving an indication of a change in identity context for an identity, after registration or association of a device with the system 100, upon or after determining or receiving an indication that one identity desires to communicate with another identity, in accordance with a rule or algorithm, etc. In some embodiments, the method 200 may include the context agent 102 determining a device context for a device, determining an identity context for an identity, receiving a request for media availability information regarding an identity, receiving a request for media availability information regarding a device associated with an identity, receiving or otherwise determining a rule governing how availability of a media channel is to be established or determined, etc.

Now referring to FIG. 4 through FIG. 7, several representative interfaces are illustrated that may be provided as part of 208 or as a result of 208. Such interfaces may be included in or part of graphical user interfaces, telephony user interfaces, etc. For purposes of the examples illustrated in the figures, assume that an identity named "Brian" has various devices, each of which supports voice calls and instant message communications. Assume that Brian or the context agent 102 has established a rule that provides that if Brian is on a voice call with one of the devices, his voice media channel capability for all of his devices is "unavailable" but his instant message media channel capability for all of his device remains "available". In some embodiments, the interfaces may provide information regarding availability of specific devices or just specific media channel types.

Figure 4:
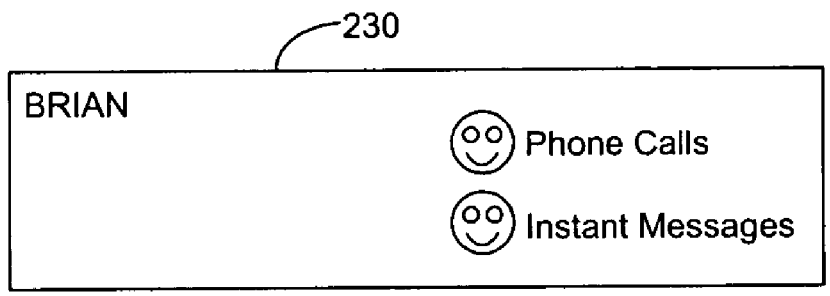
FIG. 4 is a representative example of an interface providing information regarding media availability for an identity.

If Brian currently is not participating in a voice call and is available via instant messaging, a device being used by another identity (e.g., a second user) that wants to contact Brian may display interface 230 as indicated in FIG. 4. In this example, interface 230 does not list or indicate specific devices associated with Brian. Rather, interface 230 provides information regarding types of media channels that may be used to contact Brian and Brian's availability via different media channels. As indicated in the interface 230, Brian may be contacted via instant messaging and via a voice call.

Figure 5:
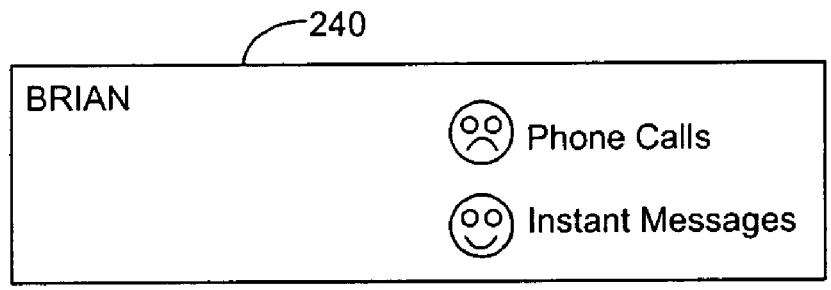
FIG. 5 is another representative example of an interface providing information regarding media availability for an identity.

If Brian then takes or participates in a voice call, a device being used by an identity (e.g., a second user that is not a participant in Brian's current voice call) that wants to contact Brian may display interface 240 as indicated in FIG. 5. The interface 240 indicates that Brian cannot currently be contacted by telephone but can be contacted via an instant message. Thus, Brian is not available via a voice media channel but is available via an instant messaging channel.

Figure 6:
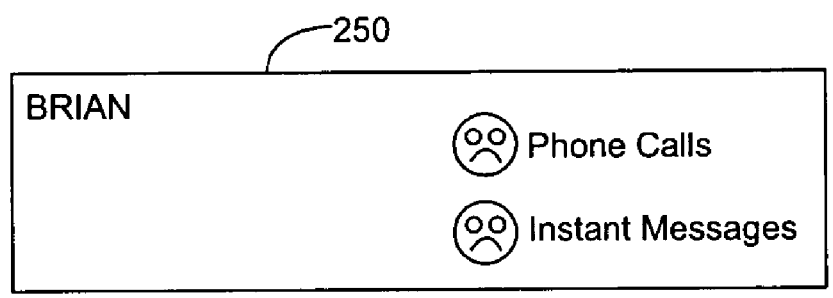
FIG. 6 is another representative example of an interface providing information regarding media availability for an identity.

If the identity then initiates an instant messaging session with Brian, another identity (e.g., another user) wanting to communicate with Brian may see the interface 250 as indicated in FIG. 6 if Brian is not able to participate in more than one instant messaging session at a time. In this scenario, Brian is not available via a voice channel or an instant messaging channel. If Brian can participate in another instant messaging session, the new identity may see the interface 240, which indicates that Brian is available via an instant messaging channel, even though Brian already is participating in a voice call and an instant messaging session.

Figure 7:
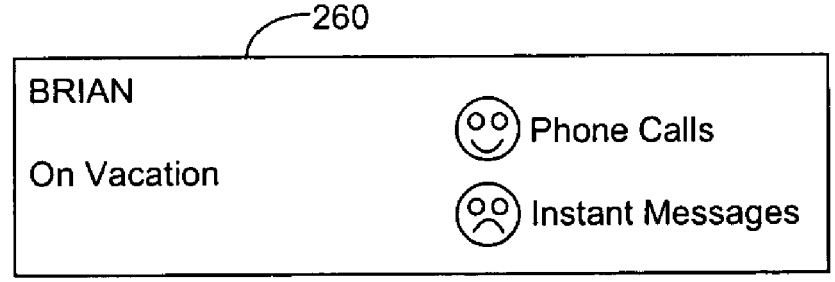
FIG. 7 is another representative example of an interface providing information regarding media availability for an identity.

If Brian's identity context is unavailable for all media (e.g., his identity context is "on vacation"), a device being used by another identity (e.g., a second user) that wants to contact Brian may see an interface that indicates Brian's identity context and/or that Brian is unavailable. For example, the interface 250 may display "on vacation" under Brian's name to indicate Brian's identity context. If Brian's identity context is "on vacation" but he is still available via voice call (which may only reach an answering machine or voice message service associated with Brian) but not instant messaging, the other identity may see the interface 260 as indicated in FIG. 7.

In some embodiments, an identity may be able to engage in more than one communication via any specific media channel type. For example, an identity may be able to engage in more than one telephone call simultaneously, more than one instant messaging session simultaneously, etc. Thus, the unavailability state for a specific media channel type may be reached only when the identity reaches the limit of communication capability for that specific media channel type.

Server

Figure 8:
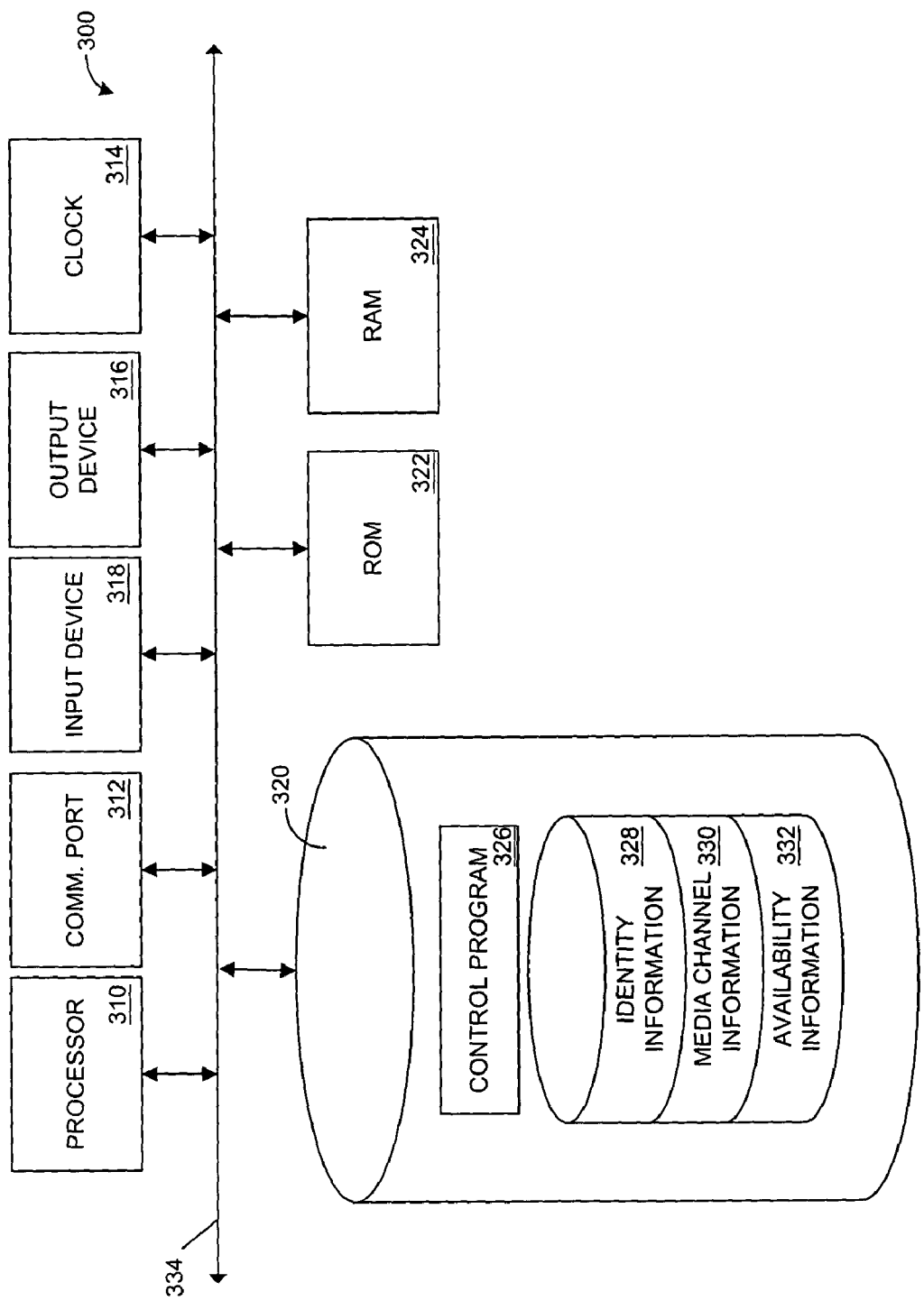
FIG. 8 is a block diagram of a server that may implement one or more of the components of FIG. 1 and/or one or more elements of the methods described herein.

Now referring to FIG. 8, a representative block diagram of a server or controller 300 is illustrated. In some embodiments, the server 300 may include or operate an identity context oriented application, a device context oriented application, the context agent 102, and/or the presence and availability service 106. The server 300 can comprise a single device or computer, a networked set or group of devices or computers, a workstation, mainframe or host computer, etc. In some embodiments, the server 300 may implement or be adapted to implement one more elements of the methods disclosed herein.

The server 300 may include a processor, microchip, central processing unit, or computer 310 that is in communication with or otherwise uses or includes one or more communication ports 312 for communicating with user devices and/or other devices. Communication ports may include such things as local area network adapters, wireless communication devices, Bluetooth technology, etc. The server 300 also may include an internal clock element 314 to maintain an accurate time and date for the server 300, create time stamps for communications received or sent by the server 300, etc.

If desired, the server 300 may include one or more output devices 316 such as a printer, infrared or other transmitter, antenna, audio speaker, display screen or monitor, text to speech converter, etc., as well as one or more input devices 318 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 300 may include a memory or data storage device 320 to store information, software, databases, documents, communications, device drivers, etc. The memory or data storage device 320 may include an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 300 also may include separate ROM 322 and RAM 324.

The processor 310 and the data storage device 320 in the server 300 each may be, for example: (i) located entirely within a single computer or other computing device; or (ii) connected to each other by a remote communication medium, such as a serial port cable, telephone line or radio frequency transceiver. In one embodiment, the server 300 may comprise one or more computers that are connected to a remote server computer for maintaining databases.

A conventional personal computer or workstation with sufficient memory and processing capability may be used as the server 300. The server 300 may be capable of high volume transaction processing, performing a significant number of mathematical calculations in processing communications and database searches. A Pentium™ microprocessor such as the PentiumIII™ or IV™ microprocessor, manufactured by Intel Corporation may be used for the processor 310. Equivalent or other processors may be available from Intel, IBM Corporation, Motorola, Inc., AMD, Sun Microsystems, Inc., or others The processor 310 also may comprise one or more microprocessors, computers, computer systems, etc.

Software may be resident and operating or operational on the server 300. The software may be stored on the data storage device 320 and may include a control program 326 for operating the server, databases, etc. The control program 326 may control the processor 310. The processor 310 preferably performs instructions of the control program 326, and thereby operates in accordance with the methods described in detail herein. The control program 326 may be stored in a compressed, uncompiled and/or encrypted format. The control program 326 furthermore includes program elements that may be necessary, such as an operating system, a database management system and device drivers for allowing the processor 310 to interface with peripheral devices, databases, etc. Appropriate program elements are known to those skilled in the art, and need not be described in detail herein.

The server 300 also may include or store information regarding identities, user devices, contexts, mapping tables, communications, etc. For example, information regarding one or more identities may be stored in an identity information database 328 for use by the server 300 or another device or entity. Information regarding one or more devices may be stored in a device information database 330 for use by the server 300 or another device or entity and information regarding media capability availability may be stored in an availability information database 332 for use by the server 300 or another device or entity. In some embodiments, some or all of one or more of the databases may be stored or mirrored remotely from the server 300.

According to some embodiments, the instructions of the control program may be read into a main memory from another computer-readable medium, such as from the ROM 322 to the RAM 324. Execution of sequences of the instructions in the control program causes the processor 310 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 310, communication port 312, clock 314, output device 316, input device 318, data storage device 230, ROM 322, and RAM 324 may communicate or be connected directly or indirectly in a variety of ways. For example, the processor 310, communication port 312, clock 314, output device 316, input device 318, data storage device 320, ROM 322, and RAM 324 may be connected via a bus 334.

While specific implementations and hardware/software configurations for the server 300 have been illustrated, it should be noted that other implementations and hardware configurations are possible and that no specific implementation or hardware/software configuration is needed. Thus, not all of the components illustrated in FIG. 8 may be needed for the server 300 implementing the methods disclosed herein. For example, in some embodiments, a system, may include a processor; a communication port coupled to the processor and adapted to communicate with a plurality of network devices; and a storage device coupled to the processor and storing instructions adapted to be executed by the processor to determine a device associated with an identity; determine a media capability associated with the device; determine availability information for the media capability; and provide data indicative of the availability information.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although various embodiments have been described herein, those skilled in the art will note that various substitutions may be made to those embodiments. The invention described in the above detailed description is not intended to be limited to the specific form set forth herein, but is intended to cover such alternatives, modifications and equivalents as can reasonably be included within the spirit and scope of the appended claims.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method, comprising the steps of:
  determining a plurality of communication devices associated with an identity, wherein each of the plurality of communication devices have multiple media capabilities;
  determining at least one media capability of the multiple media capabilities associated with each of said plurality of communication devices;
  determining an availability state for each of said at least one media capability of the multiple media capabilities associated with each of said plurality of communication devices, where the availability state provides an indication of the availability for each of said at least one specific media capability; determining a rule that governs how availability of said at least one media capability of the multiple media capabilities is to be determined; and
providing, via a user interface, an aggregated view of the availability states for each of said at least one media capability of the multiple media capabilities associated with the identity, wherein the aggregated view of the availability states for each of said at least one media capability of the multiple media capabilities associated with the identity does not display said plurality of communication devices associated with the identity via the user interface.

2. The method of claim 1, further comprising the step of:
receiving a request for information regarding media capability availability for said identity.

3. The method of claim 1, further comprising the step of:
receiving a request for information regarding media capability availability for said plurality of communication devices.

4. The method of claim 1, wherein said providing of said aggregated view of data indicative of said availability states further provides information identifying said identity.

5. The method of claim 1, wherein said providing of said aggregated view of data indicative of said availability states further provides information identifying an identity context associated with said identity.

6. The method of claim 1, further comprising the step of:
determining a device context for each of said plurality of communication devices.

7. The method of claim 1, further comprising the step of:
determining a rule governing availability of said at least one media capability.

8. The method of claim 1, further comprising the step of:
determining an identity context for said identity.

9. An article of manufacture comprising:
a computer readable medium having stored thereon instructions which, when executed by a processor, cause said processor to:
determine a plurality of communication devices associated with a identity, wherein each of the plurality of communication devices have multiple media capabilities;
determine at least one media capability of the multiple media capabilities associated with each of said plurality of devices;
determine an availability state for each of said at least one media capability of the multiple media capabilities associated with each of said plurality of communication devices, where the availability state provides an indication of the availability for each of said at least one specific media capability determining a rule that governs how availability of said at least one media capability of the multiple media capabilities is to be determined; and
provide, via a user interface, an aggregated view of data indicative of said the availability states for each of said at least one media capability of the multiple media capabilities associated with the identity, wherein the aggregated view of the availability states for each of said at least one media capability of the multiple media capabilities associated with the identity does not display said plurality of communication devices associated with the identity via the user interface.

10. A system, comprising:
a processor;
a communication port coupled to said processor and adapted to communicate with at least one device; and
a storage device coupled to said processor and storing instructions adapted to be executed by said processor to:
determine a plurality of communication devices associated with an identity, wherein each of the plurality of communication devices have multiple media capabilities;
determine at least one media capability of the multiple media capabilities associated with each of said plurality of communication devices;
determine an availability state for each of said at least one media capability of the multiple media capabilities associated with each of said plurality of communication devices, where the availability state provides an indication of the availability for each of said at least one one specific media capability; determining a rule that governs how availability of said at least one media capability of the multiple media capabilities is to be determined; and
provide, via a user interface, an aggregated view of data indicative of said the availability states for each of said at least one media capability of the multiple media capabilities associated with the identity, wherein the aggregated view of the availability states for each of said at least one media capability of the multiple media capabilities associated with the identity does not display said plurality of communication devices associated with the identity via the user interface.

* * * * *